US009950954B2

(12) United States Patent
Mikaelsson

(10) Patent No.: US 9,950,954 B2
(45) Date of Patent: Apr. 24, 2018

(54) TWO COMPONENT CEMENT COMPOSITION

(71) Applicant: SIKA TECHNOLOGY AG, Baar (CH)

(72) Inventor: Henrik Mikaelsson, Bandhagen (SE)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 14/413,629

(22) PCT Filed: Jul. 8, 2013

(86) PCT No.: PCT/EP2013/064335

§ 371 (c)(1),
(2) Date: Jan. 8, 2015

(87) PCT Pub. No.: WO2014/009298

PCT Pub. Date: Jan. 16, 2014

(65) Prior Publication Data

US 2015/0141554 A1 May 21, 2015

(30) Foreign Application Priority Data

Jul. 10, 2012 (EP) .................................... 12175667

(51) Int. Cl.

| | |
|---|---|
| ***C04B 16/04*** | (2006.01) |
| ***C04B 28/04*** | (2006.01) |
| ***C04B 28/06*** | (2006.01) |
| ***C04B 28/14*** | (2006.01) |
| ***C04B 40/06*** | (2006.01) |
| ***C04B 24/00*** | (2006.01) |
| ***C04B 24/02*** | (2006.01) |
| ***C04B 24/04*** | (2006.01) |
| ***C04B 24/16*** | (2006.01) |
| ***C04B 24/26*** | (2006.01) |
| ***C04B 24/28*** | (2006.01) |
| ***C04B 24/40*** | (2006.01) |
| *C04B 103/00* | (2006.01) |
| *C04B 111/00* | (2006.01) |
| *C04B 111/70* | (2006.01) |

(52) U.S. Cl.

CPC ............ *C04B 16/04* (2013.01); *C04B 24/003* (2013.01); *C04B 24/023* (2013.01); *C04B 24/045* (2013.01); *C04B 24/16* (2013.01); *C04B 24/26* (2013.01); *C04B 24/283* (2013.01); *C04B 24/40* (2013.01); *C04B 28/04* (2013.01); *C04B 28/06* (2013.01); *C04B 28/14* (2013.01); *C04B 40/065* (2013.01); *C04B 40/0625* (2013.01); *C04B 2103/0065* (2013.01); *C04B 2103/0075* (2013.01); *C04B 2111/00637* (2013.01); *C04B 2111/70* (2013.01)

(58) Field of Classification Search

CPC .................... C04B 16/04; C04B 24/00–24/30

See application file for complete search history.

(56) References Cited

U.S. PATENT DOCUMENTS

| | | | | |
|---|---|---|---|---|
| 4,126,005 | A * | 11/1978 | Coursen | C04B 40/0666 106/665 |
| 2003/0232909 | A1 | 12/2003 | Hettich et al. | |
| 2010/0028531 | A1 * | 2/2010 | Bruckbauer | C08L 95/00 427/138 |
| 2011/0073327 | A1 | 3/2011 | Buergel | |

FOREIGN PATENT DOCUMENTS

| | | | |
|---|---|---|---|
| CN | 102030498 | A | 4/2011 |
| EP | 0432920 | A2 | 6/1991 |
| EP | 0587383 | A1 | 3/1994 |
| EP | 1371671 | A1 | 12/2003 |
| EP | 2314556 | A2 | 4/2011 |
| JP | 2006-519282 | A | 8/2006 |
| WO | 0014026 | A2 | 3/2000 |
| WO | 2010055483 | A2 | 5/2010 |

OTHER PUBLICATIONS

Kerosene (Britannica.com). (Year: 2017).*

Peters et al. "Personal Exposure to Inhalable Cement Dust Among Construction Workers". Journal of Physics: Conference Series 151, pp. 1-5, 2009.

Jan. 7, 2014 International Search Report issued in Application No. PCT/EP2013/064335.

Jan. 7, 2014 Written Opinion issued in International Application No. PCT/EP2013/064335.

Feb. 4, 2016 Office Action issued in Chinese Patent Application No. 201380036375.7.

Apr. 4, 2017 Office Action issued in Japanese Patent Application No. 2015-520938.

Mar. 9, 2017 Office Action issued in Chinsese Patent Application No. 201380036375.7.

Oct. 19, 2016 Office Action issued in Chinese Application No. 201380036375.7.

Sep. 27, 2017 Office Action issued in Chinese Application No. 201380036375.7.

* cited by examiner

*Primary Examiner* — Wenwen Cai

(74) *Attorney, Agent, or Firm* — Oliff PLC

(57) ABSTRACT

The invention relates to a cement formulation with two liquid components. This alleviates the problems which result from dust generation where a powdered cement component is employed. Furthermore, the cement may be formed with conventional liquid handling and mixing equipment. The cement binder formulation includes a plasticizer. As the plasticizer is non-volatile, it remains an integral part of both the formulation and the final product obtained after application and drying of that formulation.

16 Claims, No Drawings

TWO COMPONENT CEMENT COMPOSITION

FIELD OF THE INVENTION

The present invention relates to cement composition intended to reduce the exposure of its users to particles of hydraulic binder. More particularly, the present invention is directed to a two-component cement composition, wherein that component which contains the hydraulic binder is in the liquid state.

BACKGROUND TO THE INVENTION

All persons who work in dusty environments are exposed to different types of health hazards such as fumes, gases and dust: these are known risk factors in the development of occupational diseases.

Cement dust exposure occurs commonly in the cement production and construction industries i.e. at both production mills and construction sites. Any regular contact of workers cement dust can cause skin and eye irritation, asthma and even allergic reactions; inhaled cement dust can causes lung function impairment, chronic obstructive lung disease, restrictive lung disease, pneumoconiosis and carcinoma of the lungs, stomach and colon; and, it has also been demonstrated that cement dust may enter into the systemic circulation and thereby impact upon organs and tissues of the body—such as the heart, liver, spleen, bone, muscles and hair—to ultimately affect their micro-structure and physiological performance.

Peters et al. "Personal Exposure to Inhalable Cement Dust among Construction Workers" Journal of Physics: Conference Series 151 (2009) 012054 documents the variable concentrations of inhalable dust to which workers are exposed depending on their role in cement production or use. Whilst plant workers are generally most exposed, persons involved in cement installation, recess milling and demolition are also certainly exposed at non-negligible levels. At the installation stage, powdered blends of cement, sand and different additives are mixed with water in situ, unfortunately causing a fine dust to infiltrate the ambient air.

This problematic effect at installation stage has been recognized in the art. For example, Ceresit Microgranulat Flex Plus (available from Cimsec) is a powdered, tile adhesive product in which finer, dust-forming cement particles are bound to form larger clusters or microgranules. Similarly, EP 0587383 (Halliburton Co.) describes a dry agglomerated cement material in which individual particles of cement are bonded together by a water-soluble binder material, typically a polyvinyl alcohol: this solid cement material is mixed with water to form a cement slurry, the water dissolving the binder to release the particles of cement which then hydrate.

EP 0432920 A2 (Rohm & Haas) describes a two-component (2K) coating composition for overlaying Portland cement concrete, the composition being a two component composition comprising: (1) a first, dry component which can be packaged and stored separately and which includes: a) at least one hydraulic cement, such as Type I or Type III Portland cement, and b) at least one epoxy resin; and, (2) a second, wet component including: (a) at least one synthetic film-forming, alkali-stable synthetic polymer latex, the latex polymer including ureido functional groups, and (b) at least on amine-functional epoxy curing agent, the curing agent being dispersible or soluble in water. The dry component including the epoxy resin can be mixed on site and in a predetermined ratio with the "wet" component including the amine-functional epoxy curing agent. The epoxy resin can bind the dust-forming, fine particles of the hydraulic binder but the author of this citation indicates that the contact of the epoxy resin with these fine particles should be minimized, where possible, to prevent over-sized clumps of binder from forming.

STATEMENT OF THE INVENTION

The invention relates to an adhesive and/or sealing formulation which is provided as a kit-of-parts comprising:

a) a hydraulic binder module being a storage-stable, liquid composition comprising gypsum, Portland cement, aluminate cement or mixtures thereof; and, an anhydrous liquid which has a boiling point greater than 175° C. at 1 atmosphere pressure and which is inert towards said hydraulic binder, wherein said anhydrous liquid is a plasticizer which remains an integral part of both the adhesive and/or sealing formulation and the final product obtained after application and drying of that formulation, and b) an aqueous liquid module.

The modules are generally mixed prior to use and application of the formulation, typically at a site of construction. Such modular systems are also referred to as two-component systems.

The kit-of-parts comprises a first component being a first storage-stable, liquid composition as described above and, a second component being an aqueous liquid. Preferably, said second component comprises water and a polymer dispersed therein.

The invention furthermore relates to the use of said formulation as an adhesive e.g. an adhesive for sandwich panels, or as a leveling compound, joint sealant or grout.

The invention also relates to composition suitable as storage stable module a) of the kit-of-parts. This is a liquid composition comprising a hydraulic binder comprising gypsum, Portland cement, aluminate cement or mixtures thereof; and, an anhydrous liquid which has a boiling point greater than 175° C. at 1 atmosphere pressure and which is inert towards said hydraulic binder, wherein the liquid composition has a water content of less than 10 wt. % by weight of the hydraulic binder.

The provision of cement formulation as two liquid components alleviates the problems which result from dust generation where a powdered cement component is employed. Furthermore, the cement may be formed with conventional liquid handling and mixing equipment.

Said anhydrous liquid preferably has a boiling point greater than 200° C., preferably greater than 225° C. at 1 atmosphere pressure. Preferably, said anhydrous liquid is a plasticizer, preferably selected from the group consisting of: polyalkyleneglycols and other polyethers, sulphonated or phosphorylated organic compounds, alkyl or aryl esters of organic acids, oils from natural or synthetic nature, a variety of vinyl polymers, and polyesters or silicones and, mixtures thereof. The anhydrous liquid may further comprise a reactive polymer.

As the plasticizer is non-volatile, it remains an integral part of both the formulation and the final product obtained after application and drying of that formulation.

DEFINITIONS

Herein the expression "hydraulic binder" is understood to mean a pulverulent material which, mixed with water, forms a paste which sets and hardens by a series of hydration reactions and processes and which, after hardening, retains its strength and its stability even under water.

The term "gypsum" as used herein is intended to include gypsum such as is normally understood in the art. This would include calcium sulfate ($CaSO_4$) and its various forms such as calcium sulfate anhydrate, calcium sulfate hemihydrate and calcium sulfate dihydrate, as well as calcined gypsum, pressure calcined gypsum and plaster of Paris.

As a raw material—for subsequent inclusion in the liquid first component of the present invention—the gypsum should have a minimum purity of 90% and be preferably finely ground to a particle size such that at least 90 wt. %, and preferably at least 99 wt. % of the gypsum particles, based on the total weight of the gypsum particles will pass through a No. 100 U.S. Standard sieve (150 microns). Such a gypsum plaster is available from a number of commercial sources. For instance, a preferred α-calcium sulfate hemihydrate is DynaPlast™ Base Alpha available from Allied Custom Gypsum Plasterworks, L.L.C.

The term "aluminate cement" as used herein is intended to include those cementitious materials normally understood in the art to contain as the main cementitious constituent, mono calcium aluminate ($CaO.xAl_2O_3$). This would include high alumina cement (HAC), calcium aluminate cement, and many other commercially available alumina cements. High alumina cement is normally understood in the art to contain greater than 15% of mono calcium aluminate.

The air permeability specific surface area (Blaine value) of the high alumina cement should be from 2000, more often from 3000 to 9000 $cm^2/g$. This fineness of the raw material facilitates its wetting and/or dispersion in the anhydrous, inert liquid of the first component.

The term "Portland cement" as used herein is intended to include those cements normally understood in the art to be "Portland cement" such as those described in British Standards Institution (BSI) EN-197 and American ASTM Standard C-150 and European Standard EN-197. The types CEM I and CEM II compositions of the latter standard are preferred for use in the present invention, although other forms of Portland cement are also suitable. Portland cement consists mainly of tri-calcium silicate and dicalcium silicate.

The Portland Cement—for subsequent inclusion in the liquid first component of the present invention—should have a Blaine value of from 3000 to 9000 $cm^2/g$, preferably from 4000 to 6000 $cm^2/g$.

A monomer is a substantially mono-disperse compound of low molecular weight—typically less than one thousand Daltons—that is capable of being polymerized.

As used herein terms including "meth" in parentheses, such as "(meth)acrylate," are intended to refer either to the acrylate or to the methacrylate, or mixtures of both. Similarly, the term (meth)acrylamide would refer either to the acrylamide or to the methacrylamide, or mixtures of both, as one skilled in the art would readily understand.

Measurement of the solids content of coating or coating materials is conducted in accordance with EPA Test Method 24 (40 CFR 60, Appendix A).

An aqueous dispersion of polymer particles is intended to encompass the meaning of latex polymer and water dispersible polymer.

A "latex" polymer means a dispersion or emulsion of polymer particles formed in the presence of water and one or more secondary dispersing or emulsifying agents (e.g., a surfactant, alkali-soluble polymer or mixtures thereof) whose presence is required to form the dispersion or emulsion. The secondary dispersing or emulsifying agent is typically separate from the polymer after polymer formation. In some embodiments a reactive dispersing or emulsifying agent may become part of the polymer particles as they are formed.

A "water-dispersible" polymer means a polymer which is capable of being combined by itself with water, without requiring the use of a secondary dispersing or emulsifying agent, to obtain an aqueous dispersion or emulsion of polymer particles having at least a one month shelf stability at normal storage temperatures.

The term "storage stable" as it applies to that component of the formulation which contains the hydraulic binder, is intended to mean that the hydraulic binder therein remains reactive towards water when mixed therewith after a period of storage, typically up to 1 year or greater.

DETAILED DESCRIPTION OF THE INVENTION

First Component

The first component of the formulation is a stable liquid or pasteous component which is formed by mixing the hydraulic binder with an anhydrous liquid, preferably a liquid plasticizer. In its broadest definition, a plasticizer is a material that when added to another yields a mixture which is easier to handle or has greater utility. In a refinement of that definition, plasticizer as used herein means an organic liquid which is usually non-volatile at standard room temperature and pressure (25° C., 1 atm.) and which has no specific chemical reactivity. As such, this liquid is inert towards the hydraulic binder and merely serves as a medium in which that binder may be suspended or otherwise dispersed.

Suitable liquid plasticizers for use in the first component according to the present invention may be selected from a broad group of compounds as any water free organic liquid with low volatility will be effective. Suitable classes of compounds include polyalkyleneglycols and other polyethers, sulphonated or phosphorylated organic compounds, alkyl or aryl esters of organic acids, oils from natural or synthetic nature, a variety of vinyl polymers, and polyesters or silicones.

Suitable polyalkyleneglycols include polyethylene glycol, blends with polypropylene glycol or other co-plasticisers to make it liquid, polypropylene glycol and other liquid polyethers in general, e.g. copolymers of ethylene oxide, propylene oxide and/or butylene oxide. Suitable sulphonated or phosphorylated organic compounds include alkyl sulfonic acid ester of phenol and cresol (for example available as Mesamoll) and aromatic sulfonamides. Suitable alkyl or aryl esters of organic acids include benzoic acid esters of glycols and their oligomers (for example available as Bensoflex), esters of 1,2 dicarboxy cyclohexane (Hydrogenated phthalates, Hexamoll DINCH), phthalic acid esters, terephthalic acid esters, trimellitates, adipic acid esters, sebasic acid esters, tartrate esters, citric acid esters and sucrose esters. Suitable oils from natural or synthetic nature include vegetable oils and their derivatives including fatty acid esters and epoxidised vegetable oils, organic liquids derived from wood and other forest products like liquid rosin esters and hydrocarbon fluids such as mineral oil or paraffinic liquids. Suitable vinyl polymers include polyisobutene, liquid polybutadiene and liquid polyacrylates. Liquid polyesters and silicone fluids are also suitable and available to the skilled person. The above mentioned plasticisers can be used in combination.

Preferably, materials which may be degraded by alkaline hydraulic binders should not be selected from the above mentioned list for use as plasticizers in the present invention. Any such degradation may be detected by the emission of an odor from the binder. Ester based compounds may be susceptible to alkaline environment.

In one embodiment of the invention, it is preferred to use polyethers, vinyl polymers, silicones and oils as the plasticizer as this improves long term stability of the formulation.

In another embodiment, it is preferred to use hydrophilic compounds such as polyalkyleneglycols, as the use of these plasticisers improve the ease of mixing with the water phase of the second components.

The selected plasticizer ought also to be compatible with the dispersed polymer(s) of the second component of the formulation. The polarity of the plasticizer—measureable with any method known to a person skilled in the art e.g. the water/octanol partition coefficient—can be used to better match the plasticizer to the dispersed polymer. By way of example and without intention to limit the present invention, where the dispersed polymer is a styrene-acrylate copolymer, a more polar plasticizer such as polypropylene glycol, fatty acid methyl esters or alkylsulfonic acid esters might be used. Conversely, where a the dispersed polymer is a styrene-butadiene copolymer, a more hydrophobic plasticizer such as mineral oil or a paraffinic liquid might best be used.

The plasticizer and/or the first component as a whole must be essentially water free. By this is meant that the plasticizer and/or the first component as a whole contain less than 10 wt. % water, by weight of the composition, preferably less than 1.0 wt. %, 0.5 wt. %, 0.2 wt. % or 0.1 wt. % and most preferably 0 wt. % water.

A sufficient amount of the plasticizer must be employed to act as a carrier material for the hydraulic binder and to ensure the first component is liquid. The exact amount of plasticizer needed will depend upon the type of hydraulic binder as well as the types and amounts of other additives which may be present in the concentrate.

The resulting mixture is subjected to sufficiently high shear forces to thoroughly disperse the dry component. A broad range of mixers can be used, which are suitable for liquid/powder blends normally used in the paint and adhesives industries. Suitable mixers include a conventional blending mill, like a ball mill or similar, dissolvers, planetary mixers, monomixers and extruder mixers such as the Buss co-kneader and twin screw extruders. The end product may be liquid, viscous or pasteous, with a viscosity up to $10^7$ mPa·s. The viscosity, time, temperature, total energy input or homogeneity can be used as criterium to end the milling process. The viscosity of the mixture in a preferred embodiment has a value from about 500 to 5,000,000 mPa·s as measured at 25° C. For viscosities up to 100 000 mPa·s a Brookfield viscosimeter may be used with a choice of spindle and rotational speed suitable for the actual viscosity range. For viscosities above 100 000 mPa·s a plate/plate oscilating rheometer may be used. The mentioned viscosity range is valid for the approximate shear rate of 5 $s^{-1}$.

Second Component

A variety of polymeric materials may be included in the aqueous, second component of the formulation. Broadly, the dispersions of polymer particles may include: (meth)acrylics; vinyls; oil-modified polymers; polyesters; polyurethanes; polyamides; chlorinated polyolefins; and, mixtures or copolymers thereof. Further, said polymers should typically have a glass transition temperature (Tg) of from −40° to 70° C. In one embodiment, soft polymers are used, such as certain acrylates and butene based polymers. In such case, the Tg of the polymer preferably is between −35° to 15° C. In case harder polymers are used, such as styrene based or methacrylate based polymers the Tg preferably ranges from 15° to 60° C., and most preferably from 25° C. to 50° C.

The Tg of a polymer is most commonly determined by differential scanning calorimetry (DSC). The Tg is the temperature at which there is a ‘sudden’ increase in the specific heat (Cp). This is manifested by a shift in the baseline of the DSC curve. The International Confederation of Thermal Analysis proposes an evaluation procedure to be used to determine the Tg. According to this procedure two regression lines R1 and R2 are applied to the DSC curve: the regression line before the event (R1) and the regression line at the inflection point (R2). These two lines define the glass transition temperature (Tg) as the intersection between R1 and R2. It should be noted that the values for the Tg obtained by DSC are dependent on the heating rate chosen during the experiment. Generally the heating rate used by DSC measurements is 5° C./min.

As preferred polymers may be mentioned: i) pure acrylate copolymers obtainable as the polymerization product of a plurality of acrylic monomers such as (meth)acrylic acid, (meth)acrylic monomers containing a hydroxyl group, (meth)acrylic acid esters and (meth)acrylonitrile; ii) styrene-acrylate copolymers obtainable as the polymerization product of a monomer mixture comprising styrene and/or substituted styrene in an amount of up to 100 wt. %, preferably of from 30 to 90 wt. % and more preferably of from 40 to 80 wt. %, based on total monomers, and one or more acrylic monomers; and, such as (meth)acrylic acid, (meth)acrylic monomers containing a hydroxyl group, (meth)acrylic acid esters and (meth)acrylonitrile; and, iii) ethylene vinyl acetate copolymers obtainable as the polymerization product of vinyl acetate, ethylene, and optionally other co-monomers.

The polymers can be prepared and used in bulk, powdered form: such powders would be re-dispersed in the water during the formation of the second component. Acronal® S 430 P (BASF SE) is an example of a suitable commercial, re-dispersible styrene-acrylate copolymer powder.

It is, however, preferred that the polymers are directly provided as a dispersion in the water based medium, which dispersion is then mixed with additional water and other additives, as required, to form the second component. Such dispersions may be provided using known commercial products such as: Styropor P555 (styrene homopolymer available from BASF Aktiengesellschaft); for styrene butadiene copolymers, Lipaton SB 3040, Lipaton SB 2740 (Polymer Latex GmBH), Styrolux 684 D (BASF Aktiengesellschaft) and, Synthomer 20W20 (Synthomer Chemie); Synthomer VL 10286 and Synthomer 9024 (styrene/butadiene/acrylonitrile terpolymer, Synthomer Chemie); for styrene acrylate copolymers, Alberdingk® H 595, Alberdingk® AS 6002 (both Alberdingk Boley), Rhodopas DS 913 (Rhodia), Acronal® 290D, Acronal® S 400, Acronal® DS 5011 (BASF Aktiengesellschaft), Vinnapas SAF 54 (Wacker Polymer Systems), Mowilith LDM 6159 (Celanese) and Lipaton AE 4620 (Polymer Latex GmBH); and, B60A (pure acrylate dispersion available from Rohm & Haas). Other exemplary commercially available latex polymers include: AIRFLEX® EF811 (available from Air Products); EPS 2505 (available from EPS/CCA); and, NEOCAR® 2300, NEOCAR® 820 and NEOCAR® 2535 (available from Dow Chemical Co.).

Alternatively, the aqueous dispersions may be provided by polymerizing appropriate monomer mixtures as will be described herein below. P. A. Lovell, M. S. El-Aasser (Editors), "*Emulsion Polymerization and Emulsion Poly-*

*mers*", John Wiley and Sons, Chichester, UK, 1997 is herein incorporated by reference. The monomer mixture should generally comprise at least one unsaturated monomer selected from the group consisting of: (meth)acrylonitrile; alkyl (meth)acrylate esters; (meth)acrylic acids; vinyl esters; and, vinyl monomers.

Suitable alkyl esters of acrylic acid and methacrylic acid are those derived from $C_1$ to $C_{14}$ alcohols and thereby include as non-limiting examples: methyl (meth)acrylate; ethyl (meth)acrylate; isopropyl (meth)acrylate; butyl (meth) acrylate; isobutyl (meth)acrylate; n-pentyl (meth)acrylate; neopentyl (meth)acrylate; cyclohexyl (meth)acrylate; 2-hexyl (meth)acrylate; 2-ethylhexyl (meth)acrylate; isobornyl (meth)acrylate; 2-hydroxyethyl (meth)acrylate, 3-hydroxypropyl (meth)acrylate, 4-hydroxybutyl (meth)acrylate, and $\epsilon$-caprolactone adducts thereof; and, di(meth)acrylate esters of alkane diols such as 1,6-hexane diol diacrylate.

Suitable vinyl esters include vinyl acetate, vinyl propionate, vinyl versatate and vinyl laurate. Suitable vinyl monomers include: ethylene; propene; butene; iso-butene; 1,3-butadiene; isoprene; styrene; $\alpha$-methyl styrene; t-butyl styrene; vinyl toluene; divinyl benzene; heterocyclic vinyl compounds; and, vinyl halides such as chloroprene. Preferably the vinyl monomers include ethylene, styrene, butadiene and isoprene.

In certain embodiments, the monomer mixture may comprise a carbonyl monomer, that is a mono-olefinically unsaturated monomer having an aldehyde group or a ketone group. The mono-olefinic unsaturation in the carbonyl monomers of this invention is typically provided by (meth) acrylate, (meth)acrylamide, styryl or vinyl functionalities. Preferably the carbonyl monomer is selected from the group consisting of: acrolein; methacrolein; vinyl methyl ketone; vinyl ethyl ketone; vinyl isobutyl ketone; vinyl amyl ketone; acetoacetoxy esters of hydroxyalkyl (meth)acrylates; diacetoneacrylamide (DAAM); diacetone(meth)acrylamide; formylstyrol; diacetone (meth)acrylate; acetonyl acrylate; 2-hydroxypropyl acrylate-acetyl acetate; 1,4-butanediol acrylate acetylacetate; and, mixtures thereof.

The polymerization of the monomer mixture should be conducted under stirring or mixing in a water based-medium. The volume of the water based medium is adjusted so that the obtained polymer emulsion offers the desired physical properties. These processes should give aqueous dispersions with a solids content of from 40 to 70% by weight. Moreover, where the resultant emulsions should be VOC compliant, the amount of hydrophilic co-solvents, such as lower alcohols, which are present in the water-based medium should be minimized. Generally, the amount of water in the second component is about 30 to 60 wt %.

Usually the polymerization will be carried out in an inert gas atmosphere, or at least in the absence of oxygen, at a temperature of from 20° to 110° C. If appropriate, conventional ionic, non-ionic or amphoteric emulsifiers can be added to the polymerization batch, said emulsifiers being described in, for example, M. Ash & I. Ash, *Handbook of Industrial Surfactants*, 3$^{rd}$ Edition, Synapse Information Resources Inc.

Preferably the polymerization is a free radical emulsion polymerizations in which the free radicals are generated by chemical initiators such as: peroxygen compounds, including potassium persulphate and ammonium persulphate; hydrogen peroxide; and, organic peroxides and hydroperoxides, including cumene hydroperoxide and t-butyl hydroperoxide. Further suitable initiators are preferably graft-linking, water-soluble redox systems which comprise, by way of example: hydrogen peroxide and a heavy metal salt; hydrogen peroxide and sulphur dioxide; or, hydrogen peroxide and sodium metabisulphite. The initiators are used, for example, in an amount of from 0.05 to 5% by weight, preferably from 0.1 to 4% by weight, based on the monomers. The free-radical-formers can be charged in the aqueous emulsifier solution or be added during the polymerization in doses. Oil soluble initiators such as t-butyl hydrogen peroxide are preferred.

During an emulsion polymerization, either the monomers can be metered directly into the initially taken mixture or they can be added in the form of an aqueous emulsion or mini-emulsion to the polymerization batch. For this purpose, the monomers are emulsified in water using the abovementioned conventional emulsifiers.

If appropriate, conventional regulators which reduce the molecular weight of the polymers forming can be used. Said regulators are preferably organic compounds which comprise sulfur in bound form, for example mercaptans, di- and polysulphides, esters and sulphides of thio- and dithiocarboxylic acids and enol sulphides. Halogen compounds, aldehydes, ketones, formic acid, enol ethers, enamines, hydroxylamine, halogenated hydrocarbons, alcohols, ethylbenzene and xylene are also suitable as regulators.

Polymers dispersed in the second, aqueous component of the formulation may, where necessary be stabilized by the addition of thereto of: an alkali-soluble polymer, such as JONCRYL®675 and JONCRYL® 678; a nitrogen-containing base, such as ammonia or an amine; and/or a nitrogen-free base, such as the inorganic metal bases KOH, CaOH, NaOH and LiOH.

Additives

The additives which can be included in the inventive, two-component formulation include, but are not limited to: set modifying agents; gypsum hydration expansion controlling agents; flow enhancing polymers; antifoaming agents; de-foaming agents; rheology modifying agents; reactive polymers; fillers, particularly inert, inorganic fillers such as calcium carbonate, ground dolomite and fine silica sand which should preferably have particle sizes of up to and including 300 microns, for example 0.05 to 300 microns; and, mixtures thereof. Whilst these additives might be added to the formulations subsequent to the mixing of its two components together, this may not be practical due to the hydraulic thickening of the formulation. Therefore it is preferred that these additives are introduced into one or both components prior to the mixing of the two components together.

The inorganic fillers mentioned above may improve the properties of the sealing and/or adhesive formulation in a number of aspects, such as improved economy, reduced shrinkage, or higher strength. These fillers, while being optional components, may be present in the formulations in significant amounts, for example up to 30%, or 50%, or even 75% by weight of the entire formulation.

Set modifying agents are used to retard or accelerate the amount of time it takes the hydraulic cementitious materials employed in the formulation to set when blended with water.

As regards gypsum and cement, examples of suitable set retarding agents include sodium bicarbonate, protein-based amino acid blends, citric acid, and the water-soluble salts (particularly monovalent metal salts) of citric acid, boric acid and tartaric acid. Of these, either tri-sodium citrate is preferred. The gypsum set retarding agent is preferably present in the formulation in an amount of from 0.05% to 0.1% by weight, although the preferred amount is specifically dependent on the desired set time and the amount, if any, of any set accelerating agent present.

Suitable set accelerating agents for the gypsum include finely ground gypsum, potassium sulphate, zinc sulphate and aluminium sulphate. Of these, a finely ground gypsum is preferred. When used, the set accelerating agent for the gypsum is preferably present in the composition in an amount of from 0.03 wt. % to 0.5 wt. %, preferably from 0.03 wt. % to 0.06 wt. % based on the total weight of the formulation. Accelerating agents are used inter alia to improve compressive strength and reduce separation and surface bleed water.

A gypsum hydration expansion controlling agent functions to limit the expansive nature of the gypsum as it hydrates. The preferred expansion controlling agent in the inventive composition is potassium sulphate. When used, the gypsum hydration expansion controlling agent is preferably present in the formulation in an amount of from 0.1% to 0.4% by weight, more preferably from 0.1% to 0.25% by weight, based on the weight of the formulation.

The first component may further comprise a moisture curable reactive polymer. Suitable polymers include polyoxyalkylenes with hydrolysable silane groups such as e.g. methoxy or ethoxy silanes. Each silane preferably has two or three hydrolysable groups and each polymer molecule preferably has more than one silane group. The polymers preferably are liquid with a viscosity between 1000 and 100 000 mPa·s at 25 °C. The reactive polymers may be delivered with a plasticiser as diluent. Suitable examples include Kaneka MS Polymer, Wacker Geniosil STP-E or Hanse ST polymers.

To aid the function of these polymers further additives can be used. Suitable additives include Vinyl tri methoxy silane, for example to scavenge water. Amino silanes such as for example Dynasylan AMMO from Evonik may improve the reaction speed of the reactive polymer as well as the adhesion of the product. A catalyst such as e.g. di-octyl tin bis 2,4-pentandione or tertiary amines such as dicyandiamide may increase the reaction speed of this polymer. They may all be included in the cement/plasticiser composition to enhance properties such as setting time, adhesion and limiting plasticiser migration.

The reactive polymer—if present—preferably is present in an amount between 2 and 50 wt % relative to the plastisizer.

When used, the anti-foaming agent is preferably present in the formulation in an amount of from 0.05% to 0.2% by weight, more preferably from 0.06% to 0.09% by weight, based on the total weight of the formulation. Foamaster™CN (Geo Specialty Chemicals) may be mentioned as a suitable, commercially available anti-foaming agent A rheology modifying agent may be included in the present formulation to reduce the bleed of water and fine particulates to the surface of mixtures formed, as well as to increase the viscosity and uniformity of the mixed formulation. Suitable rheology modifying agents generally belong to that class of rheology modifying agents possessing pseudoplastic behaviour, such as long chain polysaccharides or hetero-polysaccharides of high molecular weight with or without modifying groups attached to the hydroxyl groups of the pyranose rings. Examples include xanthan gum, diutan gum (e.g. KelcoCrete® 200 from CP Kelco) and cellulose ethers (e.g. Methocel® from Dow Chemical). As an alternative to these biopolymers, long chain high molecular weight synthetic polymers, such Melvis® and Starvis® (BASF Construction Chemicals) might also be used.

Rheology modifying agents from the class of modified inorganic clay-based materials have also been found to be suitable for use herein. Bentonite type materials, such as Optibent® (Rockwood Additives) may be specifically mentioned in this regard.

Furthermore: polyurethane thickeners, such as Bermodol PUR 2130 (AkzoNobel Surface Chemistry) and Collacral PU 80 (BASF SE); polyether polyol-based associative thickeners, such as Rheolate 310 (Elementis Specialties); and, acrylic thickeners, such as Latekoll D (BASF SE), Viscoatex™, Thixol™ and Rheotech™ (Arkema), might also be employed as rheology modifying agents in order to optimize the behavior of the formulation before, during and after application.

When used, the rheology modifying agent is present in the formulation in an amount of from 0.0005% to 5% by weight, preferably from 0.005% to 1.0% by weight, based on the total weight of the formulation. The optimum amount will depend on the effectiveness and degree of thickening that a particular additive will impart in the mixed composition, in the temperature range of application of the adhesive.

It will be understood by those skilled in the art that additional additives may be used in the present formulation, depending on the intended use thereof the composition. Examples include: dispersible silicone and wax powders such as Seal 80 from Elotex to reduce water permeability; surface hardening agents such as HD1501 from Elotex; and, pigments for affecting the color of the dried layers or films.

Method

The aqueous component may be blended with the liquid component containing the hydraulic binder using well established techniques. Obviously it may be effected manually or with a mechanical mixer: a homogenous blend has for instance been obtained using a drilling machine operable at ≥600 rpm. The advantage of a mechanical mixer is that the blended formulation can be maintained under a consistent or controlled shear prior to its application to the substrate.

In one preferred embodiment, the aqueous component and the liquid component are separately packaged in individual cartridges or are disposed in a twin chamber packaging known in the art of adhesives or sealants. The components are extruded and mixed upon that extrusion, preferably by passing each extrudate through a static mixer. An advantage of blending in this way is that it facilitates accurate volume metering if the components. The use of a static mixer also relieves the operator of the need to manually mix the components.

In the blending operation, the water to hydraulic binder ratios are adjusted according to the amount of cement required and the desired final mechanical properties. A person skilled in the art, by routine tests, can determine the desired amount of water as a function of the amount of binder, fines and ultrafines of the two components and according to measurements of compressive strength of derived, blended samples. The W/B ratio, where W denotes the amount of water and B the total amount of hydraulic binder in the blend is generally is from 0.1 to 2.0, typically 0.2 to 1.5, and preferably from 0.3 to 1.0.

In one embodiment of the process for the preparation of a cement or concrete, the amount of water used is from 120 to 400 $l/m^3$, or from 200 to 300 $l/m^3$ of freshly blended formulation.

The blending of all components will, in general, lead to the thickening of the formulation but this is not absolutely necessary as the blend can be made to have self-leveling consistency, As the formulation is thixotropic, the rheology of the adhesive can be controlled by the application of shear. Under mechanical or manual stirring, the formulation may be maintained at a viscosity suitable for its application, generally from 20,000 to 60,000 mPa·s and preferably from 40,000 to 50,000 mPa·s, as measured at 25° C. using a Brookfield Viscosimeter (Spindle 6; 100 rpm).

The formulation is blended in situ a short time, typically of the order of 1 to 10 minutes, prior to the application step. As is known in the art, steps such as shaping, moulding, pouring, injection, pumping, extrusion or calendaring may occur between the blending and hardening or application step. That aside, and in general, the formulations of the present invention can be applied over a wide range of thicknesses, depending on the requirements of the application. For an adhesive application the formulation may, for example, be applied at a consumption of from 0.1-5 kg/m$^2$, preferably from 0.5 to 2.0 kg/m$^2$ using an appropriate tool.

Upon application, and the removal of the shear used in its blending, the formulation is fast setting and therefore its viscosity increases rapidly. As is known in the art, construction materials, such as waterproofing membrane, may be bedded or pressed into the freshly applied formulation layer: this ensures that the formulation provides good wetting of the membrane surface and can quickly develop good tensile adhesion strength. The evaporation of water from the surface of the layer may cause a skin to form. To test whether a developed skin might prohibit adhesion, the applicator may simply press a finger onto the surface of the adhesive layer and assess the stickiness thereof.

The formulations of the present invention can be used for multiple purposes. For example, they can be used as: a grout to repair cracks in existing concrete structures; an adhesive grout for bonding aggregates, panels, or the like to walls to provide a decorative effect; a protective overlay for concrete structures subject to exterior exposure; a bond coat or adhesive to adhere new cement concrete to existing concrete; a bonding agent to adhere fresh cement concrete to steel reinforcing rods or plates; a protective flooring overlay or coating over existing or new concrete, metal, or wood flooring; a protective coating for stone and concrete building facades or sculpture subject to environmental degradation; a bonding agent for laminates, such as for example sandwich insulation elements.

The applied cement can be subjected to a heat treatment after setting in order to improve its mechanical properties. The post-setting treatment, also known as the curing, is generally carried out at a temperature of from 20° C. to 90° C., preferably from 60° C. to 90° C. The temperature of the treatment has to be less than the boiling point of water at the environmental pressure. Thus the temperature of the post-setting heat treatment is generally less than 100° C. but higher curing temperatures can be used by placing the cement in an autoclave in which the heat treatment is carried out at high pressures.

The duration of the post-setting heat treatment can be from 6 hours to 4 days, for example 2 days. The heat treatment is begun after the setting, generally at least one day after the setting has begun and preferably on cement which has been aged from 1 to 7 days at 20° C. Further, the heat treatment can be carried out in dry or wet environments or according to cycles which alternate the two environments, for example a treatment in a wet environment for 24 hours followed by a treatment in a dry environment for 24 hours.

EXAMPLES

The invention will now be illustrated with the reference to the following examples in which:

For component A, comprising the hydraulic binder:

Schönox SEZ is a hydraulic binder, available from Schönox GmbH.

RME is rape seed oil methyl ester or "biodiesel"

Mesamoll™ is an alkylsulphonic acid ester with phenol available from Lanxess Deutschland GmbH.

P2000E is a polypropylene glycol (PPG) available from Dow Chemical.

HYDROSEAL™ G3H is a gasoil-type aliphatic hydrocarbon solvent with a flash point of 135° C., available from Total Petrochemicals USA, Inc.

Using these raw materials, the individual components (parts A) of formulations LC 1-7 were prepared in accordance with Table 1A below.

TABLE 1A

| | Formulation number: | | | | | |
|---|---|---|---|---|---|---|
| Raw material Part A | LC1 Weight parts | LC2 Weight parts | LC3 Weight parts | LC4 Weight parts | LC5 Weight parts | LC6 Weight parts |
| Schönox SEZ | 63.0 | 63.0 | 63.0 | 48.0 | 61.0 | 63.0 |
| RME | 16.0 | | | | | |
| Mesamoll | | 18.0 | | | | |
| PPG2000 | | | 20.0 | 16.0 | | |
| Hydroseal G3H | | | | | 16.0 | 17.0 |
| Part A total | 79.0 | 81.0 | 80.0 | 64.0 | 77.0 | 80.0 |

For component B, comprising water, the following components are used. The solid content refers to typical values; specific values generally are within 2% from the typical value.

Acronal™ 716 S is a styrene/acrylic copolymer dispersion available from BASF (50% solids).

Mowilith™ 8850 is a vinyl acetate—ethylene copolymer dispersion available from Clariant. (60% solids).

UCAR™ DE 454 is an acrylic emulsion available from Dow Chemical (51% solids).

LIPATON™ SB 4520 is a finely dispersed aqueous dispersion of a carboxylated styrene-butadiene copolymer available from Synthomer S.r.l. (51% solids).

Berol™ EP 25 is a non-ionic surfactant of alcohol ethoxylate product type, available from Akzo Nobel Surface Chemistry AB.

Pigmentverteiler NL is a pigment dispersion available from BASF.

ROCIMA™ 520S BIOCIDE is a preservative based on chlormethyl-/methylisothiazolone and bronopol, available from Rohm & Haas Biocides.

Using these raw materials, the individual components (parts B) of formulations LC 1-6 were prepared in accordance with Table 1B below.

TABLE 1B

| | Formulation number: | | | | | |
|---|---|---|---|---|---|---|
| Raw material Part B | LC1 Weight parts | LC2 Weight parts | LC3 Weight parts | LC4 Weight parts | LC5 Weight parts | LC6 Weight parts |
| Acronal 716 S | 100.0 | 100.0 | 100.0 | | | |
| Mowilith 8850 | | | | 100.0 | | |

TABLE 1B-continued

| Raw material Part B | LC1 Weight parts | LC2 Weight parts | LC3 Weight parts | LC4 Weight parts | LC5 Weight parts | LC6 Weight parts |
|---|---|---|---|---|---|---|
| | Formulation number: | | | | | |
| UCAR latex DE 454 | | | | | 100.0 | |
| Lipaton SB 4520 | | | | | | 100.0 |
| Berol EP 25 | 1.0 | 1.0 | 1.0 | 1.0 | 1.0 | 1.0 |

TABLE 1B-continued

| Raw material Part B | LC1 Weight parts | LC2 Weight parts | LC3 Weight parts | LC4 Weight parts | LC5 Weight parts | LC6 Weight parts |
|---|---|---|---|---|---|---|
| | Formulation number: | | | | | |
| Pigment-verteiler NL | 0.5 | 0.5 | 0.5 | 0.5 | 0.5 | 0.5 |
| Rocima 520 S | 0.25 | 0.1 | 0.1 | 0.1 | 0.1 | 0.1 |
| Part B total | 101.75 | 101.60 | 101.60 | 101.60 | 101.60 | 101.60 |

Parts A and B were mixed in the ratio as given in Table 1C

TABLE 1C

| | LC1 Weight parts | LC2 Weight parts | LC3 Weight parts | LC4 Weight parts | LC5 Weight parts | LC6 Weight parts |
|---|---|---|---|---|---|---|
| | Formulation number: | | | | | |
| Mixing ratio A/B | 1/1.29 | 1/1.25 | 1/1.22 | 1/1.59 | 1/1.32 | 1/1.27 |

Using a first portion of each respective formulation, components (A,B) were mixed, using a vacuum planetary mixer, according to the mixing ratio also shown in Table 1C. The viscosity immediately after mixing was observed and identified either as low viscosity and self-leveling or thixotropic.

The wet mix was then poured or leveled into a shallow polypropylene jar (8.5 mm deep; 50 m diameter) and the following was observed after a period of 24 hours.

1. Cure state: if the material was solid down to the bottom of the jar, it is considered to be cured.
2. Shrinkage: if the surface is seemingly flat, the result is considered to be "no"; a small depression in the surface was denoted as "-"; and, a severe surface depression was denoted as "- -".
3. The hardness was measured using a Shore A gauge.
4. The general appearance of the surface, especially the presence of drying cracks.

The observations are recorded in Table 2 below.

For a second portion of each respective formulation, the components (A,B) were stored separately at 23° C. for 21 days. After storage, the two components (A, B) of each formulation were mixed according to the mixing ratios shown Table 1 and the observations (1-4) above were then made 24 hours after mixing. The results of these tests are also shown in Table 2 below.

TABLE 2

| Observations | | LC1 | LC2 | LC3 | LC4 | LC5 | LC6 |
|---|---|---|---|---|---|---|---|
| Rheology | | Liquid | | | Liquid | | Pasteous |
| Cure state (24 hr), no storage | Cure | Cured | Cured | Cured | Cured | Cured | Cured |
| | Shrinkage | — | — | — | No | — | — |
| | Appearance | Some cracks | Some cracks | OK | OK | | |
| | Shore A | 65 | 70 | 74 | 47 | 85 | 80 |
| Cure state (24 hr), 21 days storage | Cure | Cured | Cured | Cured | Cured | Cured | Instant gelling |
| | Shrinkage | — | — | No | No | — | |
| | Appearance | Some cracks | Some cracks | OK | OK | OK | |
| | Shore A | 61 | 75 | 78 | 47 | 85 | |

Selected formulations were further subjected to adhesion and fatigue testing.

Adhesion was tested using insulation sandwich panels: the core material of the sandwich was extruded, foamed polystyrene; a first sandwich panel was prepared using aluzinc coated steel films as the inner and outer faces of the panel; a second sandwich panel was prepared using polyester coated aluminum film as these faces; the selected formulations were applied between each film and the core; and, the surface adhered by the applied formulation was 25×50 mm. An adhesive strength test between the face films and the polystyrene core was performed, in accordance with ASTM D 1781, after 4 days and after 7 days. The results of the text were judged by observing the degree of cohesive failure in the polystyrene foam: a scale of 1-10 was used, 10 being used to denote full cohesive failure within the foam and 1 being adhesive failure, whereby a very fine film of foam is left on the adhesive. The results are shown in Table 3 below.

In the fatigue test a sandwich element was also prepared using extruded foamed polystyrene as the core, non-coated aluminum as the inner and outer faces and the respective, tested formulations as the applied adhesive: the dimension of the foam was 115×25×12 mm (L×W×H); the aluminum had dimensions 115×25×1.5 mm; and, the adhesive was cured for 7 days at 23° C. The samples were evaluated in a 3 point jig with a point distance of 50 mm; the bending amplitude was 1 mm; and, 10000 cycles were performed. After the test, the samples were examined for cracks and adhesion loss. The results of the fatigue test are also shown in Table 3 below.

TABLE 3

| | | LC1 | LC3 | LC4 | LC5 | Polyurethane Reference (2K, MDI) |
|---|---|---|---|---|---|---|
| Adhesions Tests | | | | | | |
| Aluzink coated steel/foamed polystyrene | 4 Days | 1 | 4 | 7 | 1 | 10 |
| | 7 Days | 1 | 7 | 7 | 1 | 10 |
| Polyester coated aluminium/ polystyrene foam | 4 Days | 1 | 2 | 3 | 0 | 3 |
| | 7 Days | 1 | 2 | 6 | 1 | 10 |
| Fatigue Test | | | | | | |
| 10000 Cycles | | OK | OK | OK | OK | |

Various changes and modifications to the presently preferred embodiments described herein will be apparent to those skilled in the art. Such changes and modifications can be made without departing from the scope of the present invention and without diminishing its attendant advantages. It is therefore intended that such changes and modifications are covered by the appended claims.

The invention claimed is:

1. A kit-of-parts for preparing an adhesive and/or sealing formulation comprising:

a) a hydraulic binder module being a storage-stable, liquid composition comprising:

a hydraulic binder including a mixture of gypsum, Portland cement, and aluminate cement, and an anhydrous liquid, where the anhydrous liquid has a boiling point greater than 175° C. at 1 atmosphere pressure and is inert towards the hydraulic binder, wherein the anhydrous liquid is a plasticizer that remains an integral part of both the adhesive and/or sealing formulation and the final product obtained after application and drying of the formulation; and b) an aqueous liquid module, wherein the aqueous liquid module comprises water and a polymer dispersed therein, and the amount of water comprised in the aqueous liquid module is in the range of from about 30 to 60 wt. %, wherein said dispersed polymer has a glass transition temperature (Tg) of from −40° to 70° C.

2. The kit-of-parts according to claim 1, wherein said dispersed polymer is selected from the group consisting of: poly(meth)acrylates; polyvinyls; oil-modified polymers; polyesters; polyurethanes; polyamides; chlorinated polyolefins; mixtures thereof; and copolymers thereof.

3. The kit-of-parts according to claim 1, wherein said dispersed polymer is an acrylate polymer or co-polymer.

4. The kit-of-parts according to claim 1 further comprising, distributed over one or both of the modules, from 0.1 to 10 wt. % of the formulation of one or more additives selected from the group consisting of: set modifying agents; gypsum hydration expansion controlling agents; flow enhancing polymers; rheology modifiers; anti-foaming agents; de-foaming agents; and, mixtures thereof.

5. The kit of parts according to claim 1, wherein the plasticizer is at least one member selected from the group consisting of polyalkyleneglycols, polyethers, sulphonated organic compounds, phosphorylated organic compounds, alkyl esters of organic acids, aryl esters of organic acids, natural oils, synthetic oils, vinyl polymers, polyesters, and silicones.

6. The kit of parts according to claim 1, wherein the plasticizer is selected from the group consisting of polyethers, vinyl polymers, silicones and oils.

7. The kit-of-parts according to claim 1, wherein the hydraulic binder module as a whole contains less than 1.0 wt. % water.

8. The kit-of-parts according to claim 1, wherein the hydraulic binder module as a whole contains 0 wt. % water.

9. The kit-of-parts according to claim 1, wherein a W/B ratio is from 0.1 to 2.0, where W is an amount of the water in the aqueous liquid module and B is a total amount of the hydraulic binder in the formulation.

10. The kit-of-parts according to claim 9, wherein the W/B ratio is from 0.2 to 1.5.

11. The kit-of-parts according to claim 9, wherein the W/B ratio is from 0.3 to 1.

12. A kit-of-parts for preparing an adhesive and/or sealing formulation comprising:

a) a hydraulic binder module being a storage-stable, liquid composition consisting of:

a hydraulic binder, where the hydraulic binder includes a mixture of gypsum, Portland cement, and aluminate cement, and an anhydrous liquid that has a boiling point greater than 175° C. at 1 atmosphere pressure and is inert towards the hydraulic binder, wherein the anhydrous liquid is a plasticizer that remains an integral part of both the adhesive and/or sealing formulation and the final product obtained after application and drying of the formulation; and b) an aqueous liquid module, wherein the aqueous liquid module comprises water and a polymer dispersed therein; wherein the amount of water comprised in the aqueous liquid module is in the range of from about 30 to 60 wt. %.

13. A kit-of-parts for preparing an adhesive and/or sealing formulation comprising:

a) a hydraulic binder module being a storage-stable, liquid composition comprising:

a hydraulic binder including a mixture of gypsum, Portland cement, and aluminate cement, and an anhydrous liquid, where the anhydrous liquid has a boiling point greater than 175° C. at 1 atmosphere pressure and is inert towards the hydraulic binder, wherein the anhydrous liquid is a plasticizer that remains an integral part of both the adhesive and/or sealing formulation and the final product obtained after application and drying of the formulation, wherein the plasticizer is selected from the group consisting of polyalkyleneglycols; and b) an aqueous liquid module, wherein the aqueous liquid module comprises water and a polymer dispersed therein, and the amount of water comprised in the aqueous liquid module is in the range of from about 30 to 60 wt. %.

14. The kit of parts according to claim 13, wherein said dispersed polymer has a glass transition temperature (Tg) of from −40° to 70° C.

15. The kit-of-parts according to claim 13, wherein the anhydrous liquid is a plasticizer which would lower the glass transition temperature (Tg) of the dispersed polymer in the combined adhesive and/or sealing formulation.

16. A method comprising:

combining the modules of the kit-of-parts according to claim 1 as an adhesive.

* * * * *